United States Patent [19]

Shariat

[11] Patent Number: 5,028,753
[45] Date of Patent: Jul. 2, 1991

[54] MICROWAVEABLE COFFEE MAKER

[76] Inventor: Aziz Shariat, 4064 Jefferson Ave., Redwood City, Calif. 94062

[21] Appl. No.: 611,427

[22] Filed: Nov. 9, 1990

Related U.S. Application Data

[63] Continuation-in-part of Ser. No. 469,160, Jan. 24, 1990, abandoned.

[51] Int. Cl.$^5$ .............................................. H05B 6/80
[52] U.S. Cl. ...................... 219/10.55 E; 219/10.55 M; 99/302 R; 99/306; 426/241
[58] Field of Search ................. 219/10.55 E, 10.55 R, 219/10.55 M, 10.55 F; 99/302 R, 300, 304, 306, DIG. 14, 451; 426/241

[56] References Cited

U.S. PATENT DOCUMENTS

| | | | |
|---|---|---|---|
| 3,757,670 | 9/1973 | Laama et al. | 99/302 R |
| 3,771,432 | 11/1973 | Karlen | 99/304 |
| 4,064,795 | 12/1977 | Ackerman | 99/304 |
| 4,104,957 | 8/1978 | Freedman et al. | 219/10.55 E |
| 4,132,239 | 1/1979 | Bowen et al. | 219/10.55 D |
| 4,158,464 | 6/1979 | Bowen et al. | 294/31.2 |
| 4,303,196 | 12/1981 | Raines et al. | 99/283 |
| 4,381,696 | 5/1983 | Koral | 219/10.55 E |
| 4,386,109 | 5/1983 | Bowen et al. | 99/302 R |
| 4,476,775 | 10/1984 | Daugherty | 99/304 |
| 4,577,080 | 3/1986 | Grossman | 219/10.55 E |
| 4,642,443 | 2/1987 | Jorgensen et al. | 219/10.55 E |
| 4,721,835 | 1/1988 | Welker | 219/10.55 E |
| 4,756,915 | 7/1988 | Dobry | 426/241 |
| 4,795,873 | 1/1989 | Freedman et al. | 219/10.55 E |
| 4,867,880 | 9/1989 | Pelle | 99/295 |
| 4,908,222 | 3/1990 | Yu | 219/10.55 E |

Primary Examiner—Philip H. Leung
Attorney, Agent, or Firm—Carole F. Barrett

[57] ABSTRACT

A non-pressurized, self-sealing coffee maker and a method for using the coffee maker with microwave energy is provided. The coffee maker is vented such that there is no danger associated with steam pressure. The coffee maker uses a vented siphon system which allows discontinuance of microwave energy after the siphon action has been initiated. The apparatus itself also includes a gravity transfer device which allows water to drip directly on the ground coffee and prevents scorching.

14 Claims, 2 Drawing Sheets

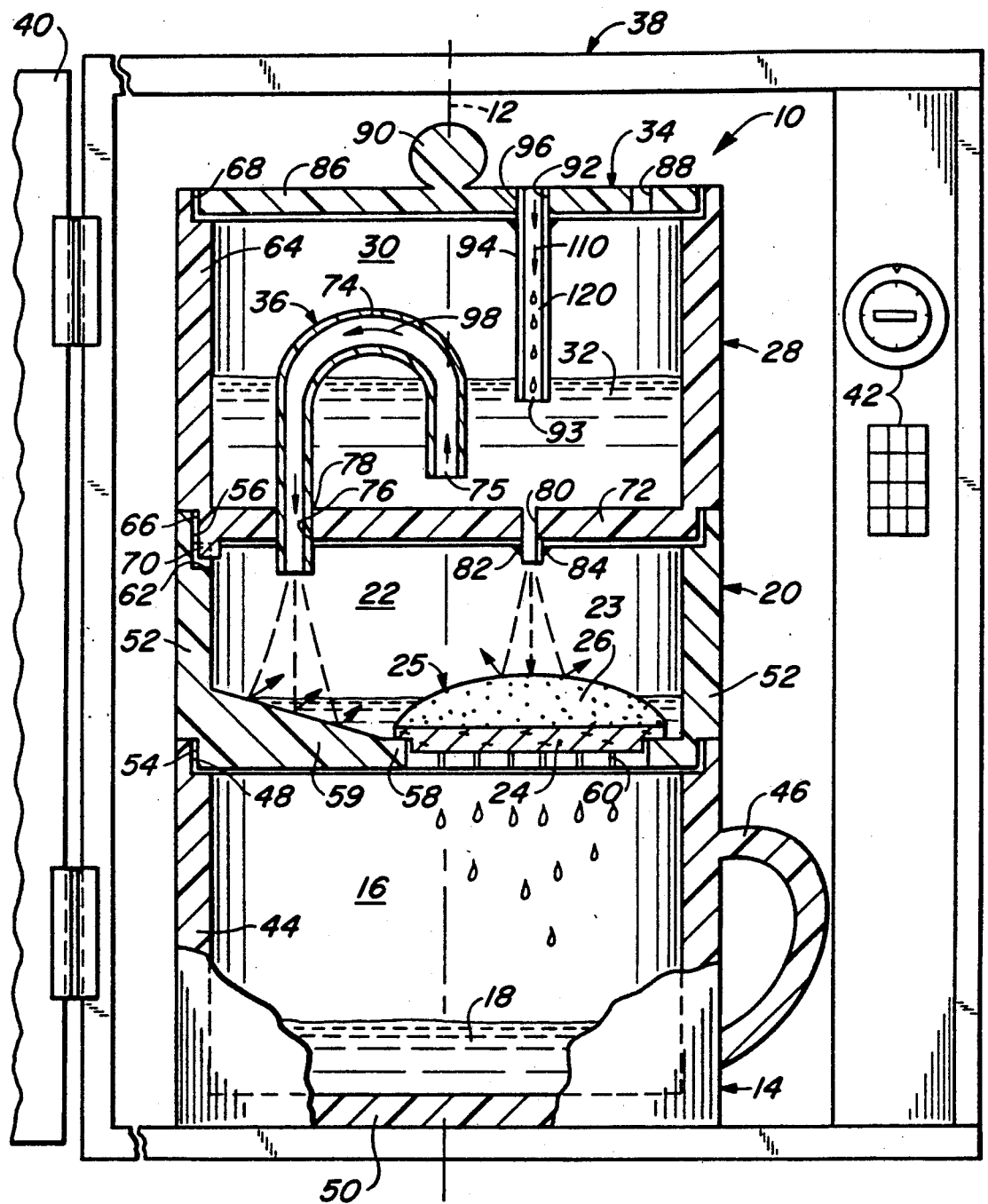
FIG._1

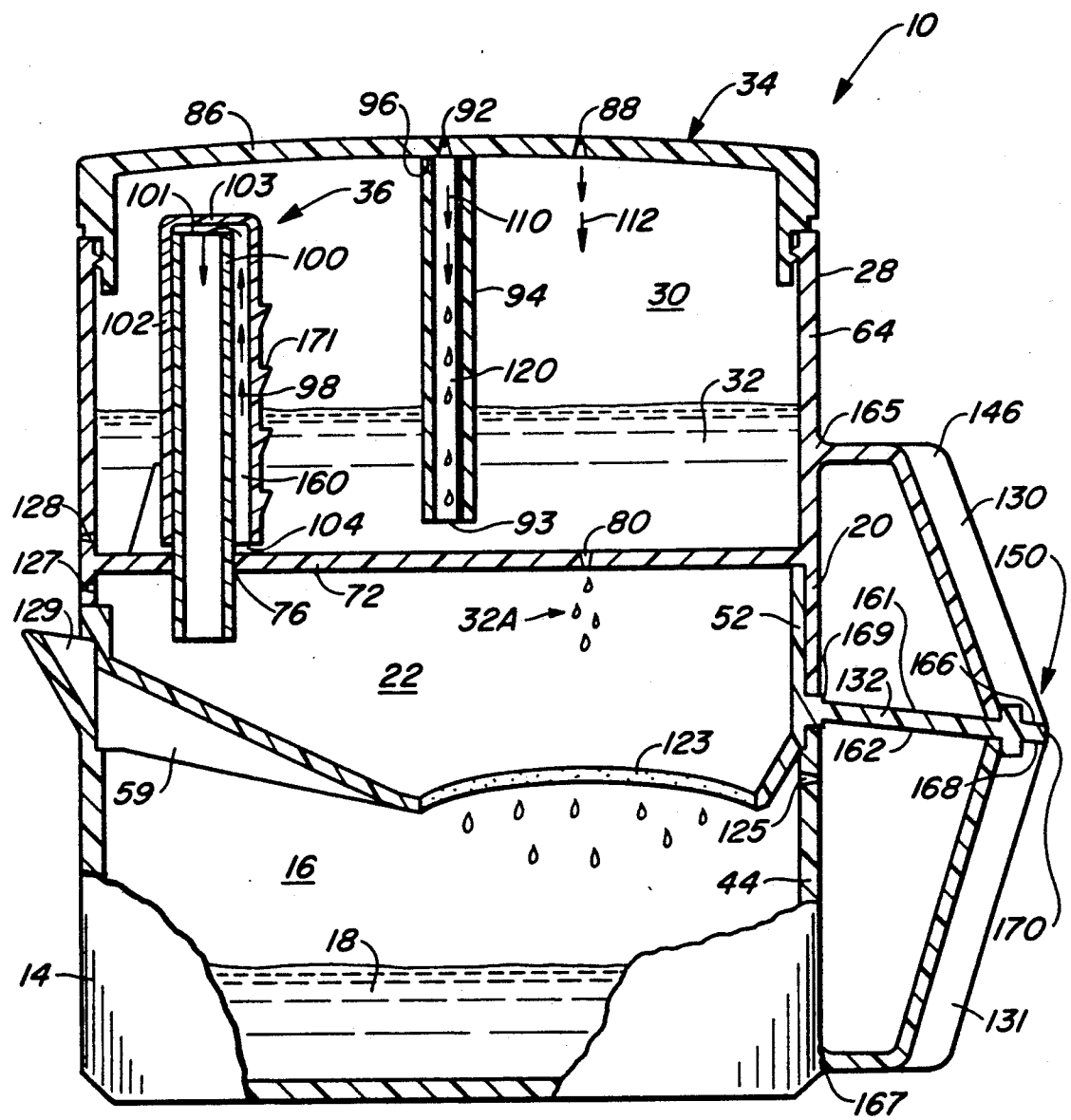
FIG._2

MICROWAVEABLE COFFEE MAKER

This is a continuation-in-part of the now abandoned U.S. application, Ser. No. 07/469,160, filed 01/24/90 now abandoned.

The invention generally relates to microwaveable liquid preparers, in particular coffee makers and the like. In particular the invention relates to a non-pressurized, self-sealing coffee maker having a siphon unit with no moving parts.

BACKGROUND OF INVENTION

Microwaveable beverage preparers are described in U.S. Pat. Nos. 4,303,196, issued Dec. 1, 1981; 4,104,957, issued Aug. 8, 1978; 4,132,239, issued Jan. 2, 1979; 4,158,464, issued June 19, 1979; 4,381,696, issued May 3, 1983; 4,642,443, issued Feb. 10, 1987; 4,721,835, issued Jan. 26, 1988; 4,756,915, issued July 12, 1988; 4,795,873, issued Jan. 2, 1989; 4,867,880, issued Sept. 19, 1989; and 4,908,222, issued Mar. 13, 1990.

The microwaveable coffee maker disclosed in U.S. Pat. No. 4,303,196, includes a receptacle unit for brewed coffee, a filter unit for passing water through coffee grinds, a reservoir unit for containing the water, and a mechanical valve for transferring the water from the reservoir unit to the filter unit. One problem with this type of microwaveable coffee maker is that the mechanical valve wears out over a period of time causing a break down.

The brewing apparatus and method disclosed in U.S. Pat. No. 4,908,222 discloses and claims a pressurized system with a pressure overflow means. This system does not resolve the problem of scorching or roasting of the ground coffee that occurs before the vapor pressure is built up in the reservoir sufficiently to force the heated water to overflow into the filter chamber. Additionally, because the process and apparatus disclosed is U.S. Pat. No. 4,908,222 is a pressurized system it is necessary to apply microwave energy throughout the entire process. If the microwave energy is discontinued during the process, the water flow will not continue. This excess of energy can cause the coffee to have an overcooked flavor. U.S. Pat. No. 4,908,222 does not disclose or claim a vented siphon system using hydraulic head as shown in the present invention. Further, it is necessary in U.S. Pat. No. 4,908,222 to have a quantity of unprepared liquid in the receptacle (38) prior to beginning the heating process. This unprepared liquid does not at any time contact the ground coffee and is therefore, not brewed. By contrast, in the present invention all of the liquid is initially in the fluid reservoir and passes through the filter unit containing the ground coffee.

In general, microwaveable coffee makers in the past have had a problem with roasting or scorching of the ground coffee before that material was contacted by heated water. This caused a burned taste in the prepared beverages which was unacceptable to the coffee drinkers. As described above, U.S. Pat. No. 4,908,222 does nothing to resolve this problem.

SUMMARY OF THE INVENTION

According to the present invention an apparatus for use with microwave energy, preferably a coffee maker is provided. This microwaveable apparatus comprises a receptacle unit for the prepared liquid, preferably coffee, a filter unit for passing an unprepared liquid, preferably water, through food or beverage particles including ground coffee or a coffee mound, a reservoir unit for containing the unprepared liquid and a siphon means for transferring a portion of the unprepared liquid after boiling from the reservoir unit to the filter unit. By using the siphon means, the problem of wearing out due to repeated transfers is avoided. The apparatus further comprises a means for transferring a small quantity of unprepared liquid, preferably water, directly from the reservoir unit to the filter unit without passing through the siphon means. By using this gravity transfer means to directly contact the food or beverage particles, in particular the ground coffee, with unprepared liquid, scorching or burning of the particles is prevented.

In a preferred embodiment, the apparatus of the present invention has at least one venting means in the lid which allows air to enter the reservoir and prevents the build up of steam pressure in the apparatus. The apparatus also has at least one venting means located in each of the filter unit and the receptacle unit. Such venting means allow air to enter the filter unit and the receptacle unit to prevent the build up of pressure within the apparatus.

The foregoing and other objects, features and advantages will be apparent from the following description of the preferred embodiments of the invention as illustrated in the accompanying figures.

BRIEF DESCRIPTION OF THE DRAWING

FIG. 1 is an elevation view, partly cutaway, of a first embodiment of the microwaveable coffee maker according to the present invention.

FIG. 2 is an elevation view, partly cutaway, of a second embodiment of the microwaveable coffee maker according to the present invention.

DETAILED DESCRIPTION OF THE INVENTION

As shown in FIG. 1, an apparatus for preparing beverages using microwave energy, preferably a coffee maker or assembly 10 is provided. Assembly 10, which has an axis 12, includes a receptacle unit 14, which has a cavity 16 for brewed coffee 18. Assembly 10 also includes a filter unit 23 which has a chamber 22 for receiving heated liquid and which includes a first filter pad 24 and an optional second filter pad 25. Beverage flakes or ground coffee or a coffee mound 26 can be used in the present invention.

Assembly 10 also includes a reservoir unit 28, which has a space 30 for unprepared water 32. Assembly 10 also includes a lid 34 disposed over space 30. Assembly 10 also includes a siphon means 36, which transfers most of the water 32 to chamber 22. Assembly 10 is placed in an oven 38 for receiving microwave energy and a control unit 42.

Receptacle unit 14 has a peripheral wall 44, which has an integral handle 46, and bottom wall 50. Peripheral wall 44 has a top inner groove 48.

Filter unit 20 has a peripheral wall 52, which has a bottom outer groove 54 and has a top inner groove 56. Filter unit 20 also has a bottom wall 58, which has an inclined wall portion 59, and which has an integral grating or sieve portion 60. Sieve portion 60 supports the first filter pad 24, which supports the coffee mound 26 and optional filter pad 25. Top inner groove 56 has a recess 62, which has a relatively short peripheral length.

Reservoir unit 28 has a peripheral wall 64, which has a bottom outer groove 66 and has a top inner groove 68.

Bottom outer groove 66 has a projection 70, which has a relatively short peripheral length which is received in recess 62, in order to orient reservoir unit 28 relative to the filter unit 20. Reservoir unit 28 also has a bottom wall 72, which supports siphon means 36.

Siphon means 36 has a siphon tube 74. Bottom wall 72 has a hole 76, through which siphon tube 74 extends. Siphon tube 74, which is U-shaped, makes a fixed connection to bottom wall 72 by molding or sonic welding or alternatively has a heat resistant adhesive or plastic adhesive mix 78, which is displaced within and adjacent to hole 76 and is disposed around the adjacent portion of tube 74. End 75 of siphon tube 74 is disposed so that it is located below the surface of the unprepared liquid 32 prior to heating of the liquid. Bottom wall 72 also has a passage means or drip hole 80, which is located over coffee mound 26 and sieve 60. Hole 80 may optionally have a grommet-type tube piece 82, that is fixedly attached to the bottom wall 72 by molding or sonic welding or alternatively has an adhesive 84 for making a fixed connection of tube piece 82 to bottom wall 72.

Lid 23 has a wall 86, which has vent hole 88, which is a means for allowing air to enter reservoir 30 in direction 112 as the liquid is heated and has optional integral knob 90. Wall 86 also has a hole 92, which has a straight tube 94, that is fixedly attached to wall 86 by molding, by sonic welding or by an adhesive 96 for making a fixed connection of tube 94 to lid wall 86. Tube 94 is located so that end portion 93 is located below the surface of the unprepared liquid 32 prior to heating of the liquid.

During the heating process tube 94 acts as a venting tube and allows air to enter through hole 92 in direction 110. The diameter of hole 92 is preferably less than diameter of tube 94. Tube 94 has optional lining or inner tube 120 inserted and composed of metal, preferably aluminum which acts as a shield and prevents the water in tube 94 from overheating and ejecting through opening 92.

In FIG. 2, a preferred embodiment of the apparatus of the present invention is shown. Assembly 10 includes a receptacle unit 14, which has a cavity 16 for brewed coffee 18; filter unit 20, which includes a permanent filter 123 for holding beverage flakes or ground coffee or a coffee mound and which is disposed over receptacle unit 14; reservoir unit 28, which has a cavity 30 for holding unprepared liquid 32 and which is disposed over filter unit 20; and a lid 34 disposed over space 30. Assembly 10 also includes a siphon means 36, which transfers most of the liquid 32 from the reservoir unit 28 to filter unit 20 and a gravity transfer means or passage 80 which transfers a small amount of water from the reservoir unit 28 directly to the ground coffee and prevents scorching or burning of the ground coffee prior to contact with the water transferred through the siphon means.

The embodiment as shown in FIG. 2, has at least one vent means in each of the receptacle unit, the filter unit, the reservoir unit and the lid. As shown, vent means 125 and spout 129 are located in the peripheral wall 44 of receptacle 14; vent means 127 is located in the peripheral wall 52 of filter unit 20; vent means 128 is located in peripheral wall 64 of reservoir unit 28; and straight tube 94 and hole 88 are located in lid 34 and act as venting means for the reservoir unit 28.

The embodiment as shown in FIG. 2 has a three piece handle means 146. The handle means 146 is formed by a downwardly curved piece 130 with a first end 165 and a second end 166. The piece is fixedly attached to peripheral wall 44 of receptacle unit 14 at first end 165. An upwardly curved piece 131 with a first end 167 and a second end 168 is fixedly attached to peripheral wall 64 at first end 167. Projection 132 with upper surface 161 and lower surface 162 and first end 169 and second end 170 has first end 169 fixedly attached to peripheral wall 52 of filter unit 20.

The second end 166 of the downwardly curved piece 130 is adapted to contact the upper surface 161 of the projection 132 proximate to its second end 170 and the second end 168 of the upwardly curved piece 131 is adapted to contact the lower surface 162 of the projection 132 proximate to its second end 170. Optional interlocking means 150 are shown in FIG. 2.

In the preferred embodiment as shown in FIG. 2, siphon means 36 has a straight tube 100 and straight tube cover 102. Straight tube 100 has a top opening 101 adapted to be located above the surface of unprepared liquid 32 in reservoir unit 28. Bottom wall 72 has a hole 76, through which straight tube 100 extends. Straight tube 100, preferably makes a fixed connection to bottom wall 72. Straight tube cover 102 is tubular and has one closed end 103 and one open end 104. Straight tube 102 is adapted to be removably fixed over the top opening 101 of straight tube 100 as shown in FIG. 2, such that the open end 104 of straight tube cover 102 is located below the surface of the unprepared liquid 32 prior to heating of the liquid, and space 160 is formed between straight tube 100 and straight tube cover 102 such that during preparation of the beverage water flows in direction 98 from the reservoir unit 28 to filter unit 20. Straight tube cover 102 also has optional water level indicators 170, shown in FIG. 2.

Bottom wall 72 of reservoir unit 28 also has a passage means or drip hole 80, which is located directly above permanent filter 24. During the beverage preparation, this hole allows a small quantity of water 32A to drip by means of gravity into chamber 22 and to contact the ground coffee directly prior to contact by water processed through the siphon system. This water 32A prevents the grounds from scorching.

As shown in FIG. 2, Lid 23 has a wall 86, which has vent hole 88, which is a means for allowing air to enter reservoir 30 as the liquid is heated. Wall 86 also has a hole 92, which has a straight tube 94, that is attached to wall 86. Tube 94 is located so that end portion 93 is located below the surface of the unprepared liquid 32 prior to heating of the liquid. During the heating process tube 94 acts as a venting tube and allows air to enter through hole 92 in direction 110. Tube 92 has inner tube 120 inserted. Tube 120 is metallic, preferably aluminum, and acts as a shield to prevent water in tube 94 from overheating and ejecting through hole 92.

The preferred materials used in assembly 10 are specified hereafter. The material of lid 34 is preferably polypropylene. The material of reservoir 28 is preferably polycarbonate. The material of filter unit is preferably polypropylene. The material of receptacle unit 20 is preferably polycarbonate. The material of the U-shaped tube 36 and straight tube 100 is preferably polycarbonate. The material of the straight tube cover is preferably polypropylene. The material of the filter unit assembly is preferably polyester fabric. The material of inner tube 120 is preferably aluminum.

The use of sealing means has been problematic in microwave preparers. This problem has been overcome in the present invention by eliminating the need for separate sealing means. The present invention is preferably a four piece unit wherein the lid and filter unit are composed of polypropylene and the filter and reservoir units are composed of polycarbonate. The pieces are easily assembled and disassembled when they were cool, i.e., before heating in the microwave oven and after heating in the microwave oven and allowing the pieces to cool down. Upon application of microwave energy to the apparatus, the apparatus is self-sealing. Upon heating with microwave enegy, a first seal is formed between the lid and the reservoir unit, a second seal is formed between the reservoir unit and the filter unit, and a third seal is formed between the filter unit and the receptacle unit, such that the pieces can not be taken apart until the apparatus cools.

The method of operation is indicated hereafter. Unprepared liquid, preferably water 32 is placed in reservoir space 30. The quantity of unprepared liquid should be sufficient so that the end portion 93 of tube 94 is below the surface of the liquid prior to application of microwave energy. The food or beverage particles, preferably ground coffee, or coffee mound 26, is placed on filter pad 24.

The process by which the present invention works is distinguishable from processes used by other microwaveable beverage preparers because the system herein is a true siphon system and the apparatus is vented so that steam pressure does not build up in the apparatus. The process of the present invention is referred to herein as hydraulic head. Hydraulic head, as it is used herein, refers to the means by which the siphon system of the present invention continues to operate after its initiation due to the pressure caused by liquid moving through a narrow tube, due to the height of the liquid and the atmospheric pressure in the reservoir.

Upon application of microwave energy, the liquid in reservoir 30 is heated and the pressure in reservoir 30 increases. As the liquid is heated, a siphon system is initiated in reservoir 30 and heated liquid moves in direction 98 through straight tube 100 or through siphon tube 74 and the heated liquid enters filter unit 20 and hits wall portion 59. Throughout the heating process, steam escapes and air enters the vents located in the apparatus. Air enters the reservoir 28 through hole 88 and also enters through hole 92 and travels in direction 110 through tube 93. The build up of pressure is also avoided by the entrance of air into the apparatus through vent means 125 and 129 in the receptacle, vent means 127 in the filter unit and vent means 128 in the reservoir.

The prepared water continues to flow in direction 98 due to the principles of hydraulic head whereby the pressure caused by the liquid moving through siphon system 36, the height of the liquid above the entry 104 or 75 of tube 100 or 74 in reservoir 30, and the atmospheric pressure in the reservoir 30 cause the water to continue to flow in the indicated direction. If the consumer desires the application of microwave energy may be discontinued as soon as the siphon system is initiated and water flows into the filter unit and the process will be completed without further application of energy.

A relatively small amount of water 32A is transported by gravity through hole 80, disposed at the bottom of reservoir 28 this allows a relatively small amount of liquid 32A to pour onto the ground coffee 26 before the ground coffee is contacted by the water passing through siphon system 36 thereby preventing the ground coffee 26 from becoming scorched or roasted. Scorched or roasted coffee has a burned taste, which is unacceptable to the consumer and is a well-known problem.

The portion of liquid 32 which traverses through siphon system 36 enters cavity 22 of filter unit 20 and runs down and over inclined wall portion 59 and then impacts and surrounds the ground coffee 26 causing a wave action around ground coffee 26. The filtration of the liquid through ground coffee 26 and into the receptacle 14 is lower than the flow of the water through siphon system 36 and into filter unit 20. The wave action over the ground coffee 26 allows all of the ground coffee 26 to be brewed equally.

The advantages of microwaveable coffee maker 10 are indicated hereafter.

(A) Maker 10 works on the principle of hydraulic head and once the siphon system has been initiated, the application of microwave energy is not needed to continue the process and may be discontinued. The advantage of this is at least two fold. First, the ground coffee and the brewed coffee resulting therefrom will not be scorched and will not have an objectionable burned taste. Second, energy costs are decreased. In the system shown in U.S. Pat. No. 4,908,222 it is necessary for the system to remain under pressure during the entire process or the process will stop. Therefore, it is necessary to continue to apply microwave energy during the entire process.

(B) Maker 10 has a variety of venting means which prevent build up of pressure during the preparation process and allow the apparatus to be used safely without fear of explosion.

(C) The use of polypropylene and polycarbonate makes the apparatus easy to assemble and disassemble when it is cool and assists the apparatus become one unit when heated, thus removing the need for separate sealing means, which wear out and/or loosen and, therefore, have in the past caused problems in microwaveable beverage preparers.

(D) Drip hole 80 allows a small quantity of water to drip onto the ground coffee or coffee mound thereby avoiding roasting or scorching of the ground coffee which has been a problem in microwaveable coffee makers. U.S. Pat. No. 4,908,222 does not disclose such a feature, and that patent specifically teaches that unprepared water should not be allowed to contact the ground coffee prior to time when ground coffee is contacted with heated water from overflow tube (column 4, lines 24–36).

(E) Maker 10 has no mechanical moving parts or seals so that breakdown from wear is avoided.

(F) Siphon means or transfer means 36 has no moving parts and can be integrally molded with reservoir unit 28 so that manufacturing cost is minimized.

(E) Parts 14, 20, 28, 34, 36 of maker 10 are composed of relatively inexpensive materials which can be molded whereby the cost of manufacture of maker 10 is minimized.

While the invention has been described in its preferred embodiments, it is to be understood that the words which have been used are words of description rather than limitation and that changes may be within the purview of the appended claims without departing from the true scope and spirit of the invention in its broader aspects.

The embodiments of an invention in which an exclusive property is claimed are defined as follows:

1. A microwavable coffee maker comprising:

a receptacle unit for receiving brewed coffee and which has a vertical axis, a peripheral wall and at least one vent means in said peripheral wall;

a filter unit for passing water through ground coffee which is coaxially mounted on top of the receptacle unit and which has a bottom wall having a filter means for supporting ground coffee and having an inclining wall portion having a surface that inclines toward the filter means for deflecting water onto and around the ground coffee and having a peripheral wall and at least one vent means in said peripheral wall;

a reservoir unit for containing the water during heating which is coaxially mounted on top of the filter unit and which has a bottom wall, peripheral wall, at least one vent means in said peripheral wall, a siphon means and a passage means;

the passage means adapted to extend through the bottom wall of said reservoir unit and having an outlet disposed directly above the filter means for transferring by gravity a first portion of water from said reservoir onto the ground coffee to prevent scorching of the ground coffee prior to transfer of a second portion of water through the siphon means;

the siphon means being disposed inside the upper reservoir and adapted to extend through and be supported by the bottom wall of the reservoir and said siphon means having an outlet disposed directly above the inclining wall portion of the filter unit and the siphon means being adapted for transferring a second portion of the water from the upper reservoir unit by hydraulic head to the inclining wall portion of the filter unit; and a lid adapted for placement over the reservoir unit and adapted to allow the reservoir to be in communication with air outside the coffee maker by means of a vent hole in the lid and by means of a straight tube having a top opening facing above the lid and a bottom opening adapted to be disposed below the surface of the water at a selective depth before applying microwave energy and to be disposed above the surface of the water as water is transferred during the preparation process.

2. The apparatus of claim 1 wherein said siphon means comprises a U-shaped tube.

3. The apparatus of claim 1 wherein the siphon means comprises:

a straight tube adapted to make a fixed connection with the bottom wall of the reservoir and to extend through a hole in the bottom wall of the reservoir and which has a top opening which is adapted to be located above the surface of unprepared liquid in the reservoir unit and a bottom opening adapted to be disposed above the inclined portion of the wall of the filter unit; and a tubular straight tube cover wherein said straight tube cover has one closed end and one open end and is adapted to be removably fixed over the top opening of the straight tube such that the open end of the straight tube cover is located below the surface of the unprepared liquid prior to heating of the liquid, and a space is formed between the straight tube and the straight tube cover such that during preparation water flows through the space to the filter unit.

4. The apparatus of claim 3 wherein said straight tube cover has an external peripheral wall and said wall has at least one water level indicator.

5. The apparatus of claim 1 wherein said lid and said filter unit are composed of polypropylene and wherein said reservoir and said receptacle are composed of polycarbonate.

6. The apparatus of claim 1 wherein said apparatus is self-sealing.

7. The apparatus of claim 1 wherein said vent means in said receptacle unit is a spout for pouring brewed coffee.

8. The apparatus of claim 1 wherein said straight tube is comprised of an outer tube and an inner tube and said inner tube is metallic.

9. The apparatus of claim 8 wherein said inner tube is aluminum.

10. The apparatus of claim 1 herein said filter means is a permanent filter.

11. The apparatus of claim 1 further comprising a handle wherein said handle is comprised of:

a top piece which is a downwardly curved piece with a first end and a second end, adapted such that the first end is fixedly attached to the peripheral wall of said reservoir unit;

a middle piece which is a projection with a fist end and a second end and an upper surface and a lower surface and adapted such that the first end is fixedly attached to the peripheral wall of said filter unit; and a bottom piece which is an upwardly curved piece with a first end and a second end, adapted such that the first end is fixedly attached to the peripheral wall of said receptacle unit; and wherein the second end of the top piece is adapted to contact the upper surface of the projection proximate to the second end of the projection and the second end of the bottom piece is adapted to contact the lower surface of the projection proximate to the second end of the projection.

12. The apparatus of claim 11 wherein said handle includes interlocking means.

13. A method of making coffee using microwave energy, which employs an apparatus having a lid adapted to be placed over a reservoir adapted to hold a quantity of liquid to be prepared, the reservoir is adapted to be disposed over a filter unit which is adapted to hold a quantity of ground coffee, the reservoir and filter unit adapted to be placed over a receptacle for the brewed coffee, wherein the reservoir is in fluid communication with the filter unit including the steps of:

placing a selected volume of water in the reservoir unit, such that when the lid is mounted over the reservoir unit a first venting means in the lid is above the surface of the water prior to the application of microwave energy and a second venting means in the lid is below the surface of the water prior to the application of microwave energy;

depositing a selected quantity of ground coffee on the filter means in the filter unit;

mounting the filter unit on top of the receptacle unit and mounting the reservoir unit on top of the filter unit such that at least one vent located in each of the filter unit, the receptacle unit and the reservoir unit allows air to enter the apparatus throughout the preparation of the brewed coffee;

mounting the lid over the liquid reservoir unit such that said first venting means in the lid is above the surface of the water in the reservoir and said second venting means is below the surface of the water in the reservoir;

heating the water using microwave energy and dripping by gravity under atmospheric pressure a first portion of the water onto the ground coffee and transferring a second portion of the water through the siphon system;

increasing the venting of the reservoir unit by increasing the air flowing through the second venting means in the lid after heated water begins to flow through the siphon system;

conducting using hydraulic head the heated second portion of water from the reservoir unit to a portion of the filter unit away from the ground coffee and deflecting the second portion of water onto and around the ground coffee;

passing the boiled water through the ground coffee to make brewed coffee; and conducting the brewed coffee into the receptacle unit.

14. The process of claim 13 wherein the application of microwave energy is discontinued after the second portion of water begins to flow through the siphon system and into the filter unit.

* * * * *